United States Patent
Blumenberg et al.

(10) Patent No.: US 6,797,015 B1
(45) Date of Patent: Sep. 28, 2004

(54) METHOD FOR PRODUCING TRANSPARENT, COLORED CELLULOSE SLEEVES

(75) Inventors: Klaus-Dieter Blumenberg, Walsrode (DE); Willi Neuschulz, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/673,944

(22) PCT Filed: Apr. 16, 1999

(86) PCT No.: PCT/EP99/02553

§ 371 (c)(1),
(2), (4) Date: Oct. 24, 2000

(87) PCT Pub. No.: WO99/55164

PCT Pub. Date: Nov. 4, 1999

(30) Foreign Application Priority Data

Apr. 28, 1998 (DE) ......................................... 198 18 891

(51) Int. Cl.$^7$ ............................. A22C 13/00; D06P 1/22
(52) U.S. Cl. .................... 8/538; 8/650; 8/653
(58) Field of Search ............................. 8/538, 650–653, 8/518; 426/250

(56) References Cited

U.S. PATENT DOCUMENTS

| | | | |
|---|---|---|---|
| 2,043,069 A | 6/1936 | Rüsch et al. ................... | 18/54 |
| 2,521,101 A | 9/1950 | Thor et al. ..................... | 99/176 |
| 3,005,723 A | * 10/1961 | Batt | |
| 3,149,905 A | 9/1964 | Weber .............................. | 8/35 |
| 3,293,340 A | 12/1966 | Wearring ..................... | 264/78 |
| 3,383,443 A | 5/1968 | Leahy et al. .................. | 264/78 |

FOREIGN PATENT DOCUMENTS

| | | |
|---|---|---|
| DE | 2262611 | 6/1974 |
| EP | 156 237 | 10/1985 |
| GB | 1038945 | * 8/1966 |
| JP | 57-176158 | 10/1982 |

* cited by examiner

Primary Examiner—Margaret Einsmann
(74) Attorney, Agent, or Firm—Joseph C. Gil; Godfried R. Akorli

(57) ABSTRACT

Process for producing dyed, tubular food wrappings from non-woven fabric coated with regenerated cellulose, characterized in that an alkaline dye liquor containing at least one dye which has been previously converted into an alkali-soluble form by chemical reduction and which can be converted into its insoluble form by oxidation is admixed to the viscose solution used for the production of the layer of regenerated cellulose, a tubular non-woven fabric is coated with the mixture of viscose solution and dye liquor, the viscose is coagulated and regenerated to form cellulose hydrate gel and the dye distributed in the viscose is reconverted into its insoluble form by oxidation; tubular food wrappings produced by this process and their use as synthetic casings for sausages.

5 Claims, No Drawings

METHOD FOR PRODUCING TRANSPARENT, COLORED CELLULOSE SLEEVES

This invention relates to a process for producing tubular dyed wrappings for food, in particular skins made of cellulose fibre, having high transparency and evenness of the dye, and also to the tubular food wrappings produced according to the invention and the use thereof.

Tubular food wrappings are used on a large scale in the production of a multitude of meat products. These food wrappings are generally thin-walled tubes of various diameters and in many cases are produced in known manner from regenerated cellulose. Cellulose wrappings can also be produced in the form of skins of cellulose fibre containing embedded fibrous material.

The appearance of sausages produced using skins of cellulose fibre is an important factor in appealing to the consumer, and a multitude of products are cured in order to obtain a characteristic brown coloration. It is also usual to dye skins of cellulose fibre, for which purpose coloured pigments and dyes are used. Particularly in the case of raw sausages in which the sausage meat has a coarse-grained structure, such as, for example, salami, it is desirable that the lumps of meat and fat should show clearly through the sausage casing in order to achieve an appearance which will promote sale. In the conventional pigment dyeing of skins made of cellulose fibre, the transparency of the sausage casings is greatly reduced owing to the diffuse refraction of light on the relatively large particles of dye.

The dyeing of cellulose films and in particular cellulose fibres with so-called vat dyes is known. The vat dyes are compounds having an indigoid or anthraquinonoid structure and are insoluble in water. They require a special dyeing process, the essential features of which have long been known. In this process, with the use of reducing agents, such as sodium hydrogen sulfite, sodium dithionite, sodium hydroxymethanesulfinate or sodium borohydride, the vat dye is first of all converted into its completely alkali-soluble leuco form. The cellulose material to be dyed is dipped into or passed through this dye liquor, which is referred to as vat. The high affinity for cellulose of the leuco dyes brings about a high rate of dyeing at the surface of the cellulose material, which can lead to unevennesses in the dye in cases where mixtures of dyes in which the leuco dyes have differing affinities for cellulose are used. There is then a diffusion of the leuco dyes into the interior of the cellulose material, the diffusion being accelerated by elevation of the temperature. After the material has been rinsed, the oxidation is carried out and the original water-insoluble dye, which adheres well to the cellulose material, is again formed from the leuco form. Examples of suitable oxidising agents are atmospheric oxygen, hydrogen peroxide, sodium perborate and potassium dichromate.

Thus U.S. Pat. No. 3,149,905 claims the dyeing and printing of cellulose-containing textile materials with vat dyes. The vat dyes used according to that patent contain sulfonamide groups. The dyeing is carried out in conventional dipping baths.

The dyeing of cellulose materials from regenerated cellulose, cellulose esters and cellulose ethers is claimed in U.S. Pat. No. 2,043,069. In this process, the vat dye in its undissolved form is mixed with the cellulose starting compound and the coagulation and regeneration are carried out. The regenerated cellulose material is subsequently passed through the reducing and oxidising baths in order to dissolve and fix the vat dyes.

A very similar process is claimed in Deutsche Offenlegungsschrift 2,262,611 for the production of cellulose films. Here the vat dye in its undissolved form is mixed with the viscose, the regeneration is carried out and the vat dye is subsequently dissolved and fixed in reducing and oxidising baths.

Comparable dyeing processes using vat dyes have not hitherto been applied, however, to the group of products comprising skins made of cellulose fibre.

A process for dyeing a skin of cellulose fibre in the gel state in dye liquors is claimed in U.S. Pat. No. 3,383,443. However, the dyes used there are not vat dyes but naphthol dyes, which are fixed with stabilised diazo compounds.

Finally, U.S. Pat. No. 3,293,340 describes a dyeing process which uses vat dyes for the production of wrappings from transparent dyed, regenerated cellulose. In this process, the still undissolved vat dye in the form of a pigment paste is mixed with the viscose and from this mixture is produced a tube of regenerated cellulose, which is regenerated in acid coagulating baths in conventional manner and subsequently washed. The use of an additional desulfurisation bath prior to or after the reduction step is recommended. The tube is then passed through an alkaline reducing bath, the vat dye being converted into the alkali-soluble leuco form. The reducing bath contains in addition 100 to 150 g/l sodium chloride in order to suppress the migration of the soluble leuco form out of the tube. The reconversion of the leuco form into the insoluble form is then effected by oxidation with atmospheric oxygen in a special duct, in which water is sprayed onto the tube in order to facilitate oxidation by-removing the reducing agent. The tube is subsequently washed again and preferably passed through another acid bath having a concentration of 1.5 to 7.5 g sulfuric acid per liter, in order to neutralise the rest of the sodium hydroxide and thereby to enable the tube to be washed more efficiently in the subsequent repeated washing step. The conventional treatment with softeners in a glycerol bath then takes place, and finally the drying step.

The process described in U.S. Pat. No. 3,293,340, owing to the use of the additional processing steps involving the reducing bath, the oxidising chamber, the intermediate washing, the subsequent acid treatment and the repeated washing, is capital-intensive as compared with the conventional processes for producing fibre-reinforced cellulose wrappings. Furthermore, because of the necessity of controlling the concentration in the reducing bath and in the acid bath, it is very expensive and in addition may altogether be seen as contributing to the waste-water loading. Where a reducing bath is used, the undesirable oxidation of the reducing agent by atmospheric oxygen cannot be avoided, owing to the large surface area in contact with the air. Considerably more reducing agent is therefore consumed than is necessary for the conversion of the dyes into the leuco form, in consequence of which the waste water is additionally polluted. In particular, the high concentration of sodium chloride in the reducing bath claimed according to the invention in the patent under discussion leads to additional waste-water loading, which is to be regarded as highly problematic in view of the environmental protection generally practised nowadays.

In the above process, moreover, the process of diffusion of the reducing agent into the regenerated tube has a decisive influence on the evenness and transparency of the dye obtained. This gives rise to difficulties in the application of the process, as skins of cellulose fibre are conventionally produced using non-woven fabric of varying thickness and varying quantities of applied viscose, depending upon the caliber. Apart from the thickness of the regenerated tube, factors which influence the diffusion rate are the temperature and concentration of the reducing bath. These influences can barely be controlled, especially when variously dyed tubes of different caliber are passed simultaneously through a reducing bath.

Accordingly, the object of the present invention was to provide a process for producing dyed, tubular food wrappings made of non-woven fabric coated with regenerated cellulose, in particular skins of cellulose fibre, having high transparency and evenness of the dye, which can be carried out at low industrial expense. In particular, the quantities of the chemicals used are to be as small as possible, so as to minimise environmental pollution.

Surprisingly, it has been found that dyes, in particular vat dyes, which are convertible into alkali-soluble form, after chemical reduction can, in their alkali-soluble leuco form, be homogeneously mixed with viscose and with this mixture dyed tubular food wrappings made of non-woven fibre coated with regenerated cellulose, in particular skins of cellulose fibre, having high transparency and evenness of dye can be easily produced by admixing to the viscose solution used for the production of the layer of regenerated cellulose an alkaline dye liquor containing at least one dye which has been previously converted into an alkali-soluble form by chemical reduction and which can be converted into its insoluble form by oxidation; by coating a tubular non-woven fabric with the mixture of viscose solution and dye liquor; by coagulating the viscose and regenerating it to form cellulose hydrate gel and by reconverting the dye distributed in the viscose into its insoluble form by oxidation.

The dyes preferably used for the process according to the invention are dyes of the class of substances comprising the anthraquinone derivatives, in particular derivatives of anthrimidecarbazole, acylaminoanthraquinone, acridone, benzan-throne, violanthrone, isoviolanthrone, indanthrene, and derivatives of more highly condensed aromatic ring systems, preferably pyrenequinone, anthanthrone, flavanthrone, pyranthrone, perylenetetracarboxylic acid, naphthalenetetracarboxylic acid as well as indigo derivatives and thioindigo derivatives.

The dyed, tubular food wrapping produced by the process according to the invention is particularly suitable for use as synthetic casings for sausages and can in addition be provided with a barrier layer on the outer and inner surface. Food wrappings produced by the process according to the invention are used particularly preferably as synthetic casings for raw sausage, sausages for boiling or sausages for cooking.

The process according to the invention for producing a transparent, dyed fibre-reinforced cellulose wrapping preferably proceeds as follows:

Commercially available vat dyes in the form of coloured pastes or powders are chemically reduced in separate tanks and dissolved in sodium hydroxide solution prior to being mixed with viscose. For example, the vat dye or mixtures of different vat dyes in the form of coloured paste or powder are placed in a tank and water, or preferably an aqueous solution of one or more cellulose ethers, in particular carboxymethyl cellulose or methylene cellulose, is added thereto. Preferably types of these cellulose ethers which are of low viscosity are used, the viscosity of their 2 wt. % solutions being preferably 30 to 300 mPa.s. A freshly prepared aqueous solution of sodium dithionite or sodium sulfide and sodium hydroxide is added thereto. It is also possible to place the vat dyes in a tank and then to add the other substances simultaneously, dissolved in water. The components are mixed with a stirrer, the rate of rotation being so adjusted that no air bubbles are introduced into the dye liquor. In the course of a residence time of preferably 12 to 16 hours at room temperature, the vat dyes are completely reduced to the leuco form and are dissolved in the lye. Afterwards, the dye liquor is stirred briefly and introduced into the receiving tanks of conventional units for mixing viscose and dye. If a toning down of the dye is desired, alkali- and acid-resistant coloured pigments in a quantity of 3 to 12 wt. %, preferably 4 to 7 wt. %, based on the total quantity of dye can also be used in this process, in addition to mixtures of vat dyes. Here the addition of cellulose ethers, besides bringing about a diminished rate of uptake of atmospheric oxygen as a result of the increase in viscosity, also effects the dispersion of the insoluble coloured pigments in the dye liquor. For the chemical reduction of the vat dyes, sodium dithionite or sodium sulfide is used in a quantity of 10 to 90 wt. %, preferably 20 to 80 wt. %, based on the pure vat dyes in the dye liquor.

Depending on the solubility of the leuco forms of the vat dyes and on the required intensity of the dye, the concentration of the leuco form in the dye liquor is 1.25 to 4.4 wt. %. The concentration of the sodium dithionite in the dye liquor is preferably 0.7 to 2.0 wt. % and that of the sodium hydroxide is 0.3 to 0.9 wt. %.

The process according to the invention henceforth makes possible the precise adjustment of the quantities of chemicals to the respective vat dyes and hence the prevention of their irreversible overreduction. In particular the introduction of large excess quantities of reducing agents, which are necessary where reducing baths are used owing to oxidation by atmospheric oxygen, is omitted. The coagulation of the viscose in the course of being mixed with the dye liquor is prevented by the low concentrations of salt in the dye liquor. Agglomeration of dye in the dyed sausage casing is consequently avoided.

If relatively prolonged storage of the finally prepared dye liquor is required, the containers should be filled with it as fully as possible and closed with an air-tight seal, in order to prevent oxidation by atmospheric oxygen. The units for mixing viscose and dye are conventional devices for the continuous mixing of the dye liquor and the viscose. A fixed proportion of viscose to metered dye liquor is established by means of adjustable delivery pumps. The addition of the dye liquor to the viscose is 2 to 26 liters, preferably 3 to 9 liters, per 100 kg viscose. The receiving tanks of the units for mixing viscose and dye can be closed with an air-tight seal and the gas space above the dye liquor can be flushed with nitrogen in order to prevent the oxidation of the dye liquor by atmospheric oxygen during longer production runs. The dyed viscose is passed via piping or tubing to the viscosing nozzles conventionally used. Here the web of non-woven fabric shaped in the form of a tube, which is adjusted depending on the tube diameter to be produced, is preimpregnated and coated on one or both sides with the dyed viscose. The tube of non-woven fabric coated with dyed viscose is passed through a conventional, acid- and salt-containing system of coagulating baths, during which the tube in various places is fully immersed in the bath and also passes through vertical air gaps. The viscose is converted into regenerated cellulose by the sulfuric acid contained in the baths and at the same time the leuco form of the indanthrene dyes contained therein is reconverted by oxidation with atmospheric oxygen into the original, insoluble dye, which adheres firmly to the cellulose material. Afterwards the tube of regenerated cellulose is washed in conventional manner, passed through a softening bath and dried with supporting air. Where the wrapping is used in the production of sausages for cooking and sausages for boiling, a barrier layer against atmospheric oxygen and water vapour may optionally be applied to the outer or inner side by known methods.

In this process claimed according to the invention, commercially available vat dyes which are convertible into an alkali-soluble form by chemical reduction can be used such as, for example, the violanthrone derivative indanthrene brilliant green (C.I. Part 1: vat green 1, C.I. Part 2: 59825), the naphthalenetetracarboxylic acid derivative indanthrene brilliant orange GR (C.I. Part 1: vat orange 7, C.I. Part 2: 71105), the anthanthrone derivative indanthrene brilliant orange RF (C.I. Part 1: vat orange 3, C.I. Part 2: 59300), the thioindigo derivative indanthrene brilliant pink R (C.I. Part 1: vat red 1, C.I. Part 2: 73360), the violanthrone derivative indanthrene blue (C.I. Part 1: vat blue 20, C.I. Part 2: 59800), the benzanthrone derivative indanthrene grey (C.I. Part 1: vat black 8, C.I. Part 2: 71000), indanthrene scarlet GG (C.I. Part 1; vat red 14, C.I. Part 2:71110), the naphthalenetetracarboxylic acid derivative indanthrene Bordeaux RR (C.I. Part 1: vat red 15, C.I. Part 2: 71100), the acylaminoanthraquinone derivative indanthrene yellow F3GC (C.I. Part 1: vat yellow 33, C.I. Part 2: 65430), the benzopyrenequinone indanthrene yellow GOK (C.I. Part 1: vat yellow 4, C.I. Part 2: 59100) and perylenetetracarboxylic acid derivatives, such as paliogenmarron (C.I. Part 1: pigment red 179, C.I. Part 2: 71130). C.I. in each case denotes the generic name and/or constitution number according to the Colour Index issued by the Society of Dyers and Colourists.

Coloured pastes or powders of these pigments are marketed, for example, under the names Suprafix pastes or Colloisol.

The invention is illustrated in more detail by the following Examples.

EXAMPLES

Example 1

In a sealable container of 30 liters in volume, 30.04 kg of a dye liquor was prepared as follows:

6 kg commercially available dye paste containing approximately 22% of the dye Red 179, C.I. 71130 (6300 Vocofil Rot, Ari Chemie) and 210 g pigment black 7, C.I. 77266, pigment preparation with the name of Novofil Schwarz BB03, pigment content approximately 35% (water-insoluble pigment) were weighed out. A freshly prepared solution of 230 g carboxymethyl cellulose (CRT 30 GA, Wolff Walsrode)

500 g sodium hydroxide solution (50 wt %)

600 g sodium dithionite in 22.5 kg of water was added thereto.

The components were gently stirred with a paddle mixer, the rate of rotation being so adjusted that no air bubbles were introduced into the dye liquor. After a residence time of 12 hours in the sealed container, this dye liquor was mixed continuously in constant ratio with viscose, in a ratio of 3.3 l dye liquor to 100 kg viscose. A web of non-woven fabric having a width of cut corresponding to a nominal caliber of 58 mm of the skin of cellulose fibre to be produced was shaped into a tube and preimpregnated and coated on the inner and outer side with the dyed viscose through spinnerets of the type described in EP 0 267 489.

The tube was then coagulated in an acid spinning solution and regenerated to form cellulose hydrate gel and at the same time the leuco form of the indanthrene dyes contained therein was reconverted by oxidation with atmospheric oxygen into the original, insoluble dye, which adhered firmly to the cellulose material. The salts formed as a result of the precipitation and the acid taken up were then removed from the tube of regenerated cellulose in the subsequent wash. Prior to the final drying to a moisture content of about 7 wt. %, based on the total weight of the wrapping, the skin of cellulose fibre was passed through a conventional softening bath of glycerol.

Sausages of the salami type were produced using this skin of cellulose fibre. The sausage casing on the finally prepared sausage exhibited high transparency and an even dye.

Example 2

A skin of cellulose fibre having a nominal caliber of 50 mm was produced in a manner similar to that described in Example 1, but the sequence of the dye liquor preparation process was altered and the concentration of the dye and of the reducing agent was lowered.

In a sealable container of 30 liters in volume, 30.0 kg of a dye liquor was prepared in the following manner:

3.015 kg of a paste, consisting of 3.0 kg dye paste Red 179, C.I. 71130, pigment content approximately 22% (6300 Vocofil Rot, Ari Chemie) and 0.105 kg pigment paste black 7, C.I. 77266, pigment content approximately 35% (water-insoluble pigment) were weighed out. 10.455 kg of a 5 wt. % solution of carboxymethyl cellulose (CRT 30 GA, Wolff Walsrode) was added thereto.

A freshly prepared solution of 250 g sodium hydroxide solution (50 wt. %) and 300 g sodium dithionite in 2.5 kg water was added thereto, with gentle stirring with a paddle mixer, the rate of rotation being so adjusted that no air bubbles were introduced into the dye liquor.

After a residence time of 16 hours in the sealed container, this dye liquor was mixed continuously with viscose, in a ratio of 7.0 l dye liquor to 100 kg viscose. As described in Example 1, a tubular web of non-woven fabric was coated with the dyed viscose, regenerated and oxidised, then washed, passed through a softening bath and dried.

Sausages of the salami type were produced using this skin of cellulose fibre. The sausage casing on the finally prepared sausage exhibited high transparency and an even dye which, as regards the intensity, corresponded to the sausages in Example 1.

Example 3

A skin of cellulose fibre having a nominal caliber of 50 mm was produced in a manner similar to that described in the previous Examples, but here the dyeing was carried out using a brown vat dye. The sequence of the dye liquor preparation process and the concentration of the reducing agent corresponded to those in Example 2.

In a sealable container of 30 liters in volume, 30.0 kg of a dye liquor was prepared as follows:

1.0 kg of an indanthrene pigment paste of vat brown 57, having a pigment content of approximately 30% (223 Vocafil brown dye, Ari Chemie) was weighed out. To this was added 0.8364 kg of a 5 wt. % solution of carboxymethyl cellulose (CRT 30 GA, Wolff Walsrode) and 12.196 kg water. The incorporation of air was prevented by gentle stirring with a paddle mixer, during which a freshly prepared solution of 200 g sodium hydroxide solution (50 wt. %) and 240 g sodium dithionite in 2.0 kg water was added.

After a residence time of 16 hours in the sealed container, this dye liquor was mixed continuously with viscose, in a ratio of 6.2 l dye liquor to 100 kg viscose. A tubular web of non-woven fabric was coated with the dyed viscose, regenerated and oxidised, then washed, passed through a softening bath and dried, as described in Example 1. Sausages of the salami type were produced using this skin of cellulose fibre. The sausage casing on the finally prepared sausage exhibited high transparency of the even, reddish-brown dye.

What is claimed is:

1. Process for producing dyed, tubular food wrappings from non-woven fabric coated with regenerated cellulose, characterized in that an alkaline vat dye liquor containing at least one vat dye which has been previously converted into an alkali-soluble form by chemical reduction with an aqueous solution containing sodium sulfide and carboxymethyl cellulose and which can be converted into its insoluble form by oxidation is admixed to the viscose solution used for the production of the layer of regenerated cellulose, a tubular non-woven fabric is coated with the mixture of viscose solution and vat dye liquor, the viscose is coagulated and regenerated to form cellulose hydrate gel and the vat dye distributed in the viscose is reconverted into its insoluble form by oxidation.

2. Process according to claim 1, characterised in that vat dyes of the class of substances comprising the anthraquinone derivatives, selected from the group consisting of derivatives of anthrimidecarbazole, acylaminoanthraquinone, acridone, benzanthrone, violanthrone, isoviolanthrone, indanthrone, and derivatives of more highly condensed aromatic ring systems, selected from the group consisting of pyrenequinone, anthanthrone, flavanthrone, pyranthrone, perylenetetracarboxylic acid, naphthalene-tetracarboxylic acid as well as indigo derivatives and thionidigo derivatives are used.

3. Process according to claim 1, characterised in that for the chemical reduction of the vat dye, sodium sulfide is used in a quantity of 10 to 90 wt. % based on the pure, reducible dye in the dye liquor.

4. Process according to claim 1, characterised in that the addition of the vat dye liquor to the viscose is 2 to 26 liters, per 100 kg viscose.

5. Process according to claim 1, characterised in that the vat dye liquor contains in addition alkali- and acid-resistant non-reducible coloured pigments in a quantity of 3 to 12 wt. %, based on the total quantity of dye and vat pigment.

* * * * *